(12) United States Patent
Pan et al.

(10) Patent No.: US 12,461,450 B2
(45) Date of Patent: Nov. 4, 2025

(54) OPC MODELING METHOD

(71) Applicant: HeFeChip Corporation Limited, Hong Kong (CN)

(72) Inventors: Yinuo Pan, Zhejiang (CN); Yingfang Wang, Shanghai (CN); Keeho Kim, Hartford, CT (US); Norman S. Chen, Ballston Spa, NY (US); Eric S. Parent, Ballston Spa, NY (US)

(73) Assignee: HEFECHIP CORPORATION LIMITED, Hong Kong (CN)

( * ) Notice: Subject to any disclaimer, the term of this patent is extended or adjusted under 35 U.S.C. 154(b) by 560 days.

(21) Appl. No.: 18/076,814

(22) Filed: Dec. 7, 2022

(65) Prior Publication Data
US 2024/0192609 A1 Jun. 13, 2024

(30) Foreign Application Priority Data

Sep. 13, 2022 (CN) .......................... 202211111853.3

(51) Int. Cl.
G03F 7/00 (2006.01)
G03F 1/70 (2012.01)
(Continued)

(52) U.S. Cl.
CPC ............ *G03F 7/70441* (2013.01); *G03F 1/70* (2013.01); *G03F 7/705* (2013.01); *G06F 30/30* (2020.01); *G03F 1/36* (2013.01); *G06F 2111/06* (2020.01)

(58) Field of Classification Search
None
See application file for complete search history.

(56) References Cited

U.S. PATENT DOCUMENTS 7,778,805 B2 * 8/2010 Huang ...................... G03F 1/36
703/2
7,844,938 B2 * 11/2010 Rosenbluth ............... G03F 1/36
716/55
(Continued)

FOREIGN PATENT DOCUMENTS

CN 104570585 A 4/2015
CN 114077774 A 2/2022
(Continued)

OTHER PUBLICATIONS

T. E. Zavecz, "Bossung Curves; an old technique with a new twist for sub-90 nm nodes," Metrology, Inspection, and Process Control for Microlithography XX, Proc. of SPIE vol. 6152, 10 pages. (Year: 2006).*

(Continued)

*Primary Examiner* — Leigh M Garbowski
(74) *Attorney, Agent, or Firm* — MUNCY, GEISSLER, OLDS & LOWE, P.C.

(57) ABSTRACT

An OPC modeling method is disclosed, which includes: step S1: determining optical model parameters and resist model parameters; step S2: obtaining a plurality of parameter combinations by stochastically choosing values for the parameters; step S3: performing photolithography simulations and etching wafers and calculating RMS values of differences between simulated CDs and etching CDs and BCE values of the CDs; step S4: evaluating the values according to Pareto principle and calculating Pareto optimum to N-th-best Pareto suboptimum sets to prioritize the plurality of parameter combinations in a descending order; step S5: applying a genetic algorithm with position-based crossover and/or mutation to the plurality of parameter combinations, to obtain new parameter combinations; and step S6: iterating steps S3 to S5 on the new parameter combinations until a number of iterations reaches a first (Continued)

predetermined value and using highest prioritized ones of parameter combinations resulting from a last iteration for OPC modeling.

11 Claims, 1 Drawing Sheet

(51) Int. Cl.
*G06F 30/30* (2020.01)
*G03F 1/36* (2012.01)
*G06F 111/06* (2020.01)

(56) References Cited

U.S. PATENT DOCUMENTS

| | | | |
|---|---|---|---|
| 12,354,920 B2* | 7/2025 | Yeo | G03F 7/70441 |
| 2007/0100591 A1 | 5/2007 | Harazaki | |
| 2014/0297223 A1* | 10/2014 | Hibbs | G01B 11/24 |
| | | | 702/155 |

FOREIGN PATENT DOCUMENTS

| | | |
|---|---|---|
| KR | 10-2009-0066926 A | 6/2009 |
| WO | WO2017004312 A1 | 1/2017 |

OTHER PUBLICATIONS

D. A. Dipaola et al., "Optimizing Models Based OPC Fragmentation using Genetic Algorithms," Photomask Technology, Proc. of SPIE vol. 7122, 9 pages. (Year: 2008).*

W. C. Huang et al., "OPC modeling by genetic algorithm," Optical Microlithography XVIII, Proc. of SPIE vol. 5754, pp. 1229-1240. (Year: 2008).*

D. Albanese et al., "minerva and minepy: a C engine for the MINE suite and its R, Python and AMATLAB wrappers," Bioinformatics, vol. 29, No. 3, pp. 407-708. (Year: 2012).*

D. Gasior et al., "Pareto-optimal Nash equilibrium in capacity allocation game for self-managed networks," Computer Networks 57, pp. 2817-2832. (Year: 2013).*

V. I. Zhukovskiy et al., "Pareto-Optimal Nash Equilibrium: Sufficient Conditions and Existence in Mixed Strategies," Automation and Remote Control, vol. 77, No. 8, pp. 1500-1510. (Year: 2016).*

D. Cao et al., "An improved algorithm for the maximal information coefficient and its application," Royal Society Open Science 8, 12 pages. (Year: 2021).*

J. Huang et al., "Genetic algorithm to speed up modeling turn-around-time," 2021 Int'l Workshop on Advanced Patterning Solutions (IWAPS), 4 pages. (Year: 2021).*

* cited by examiner

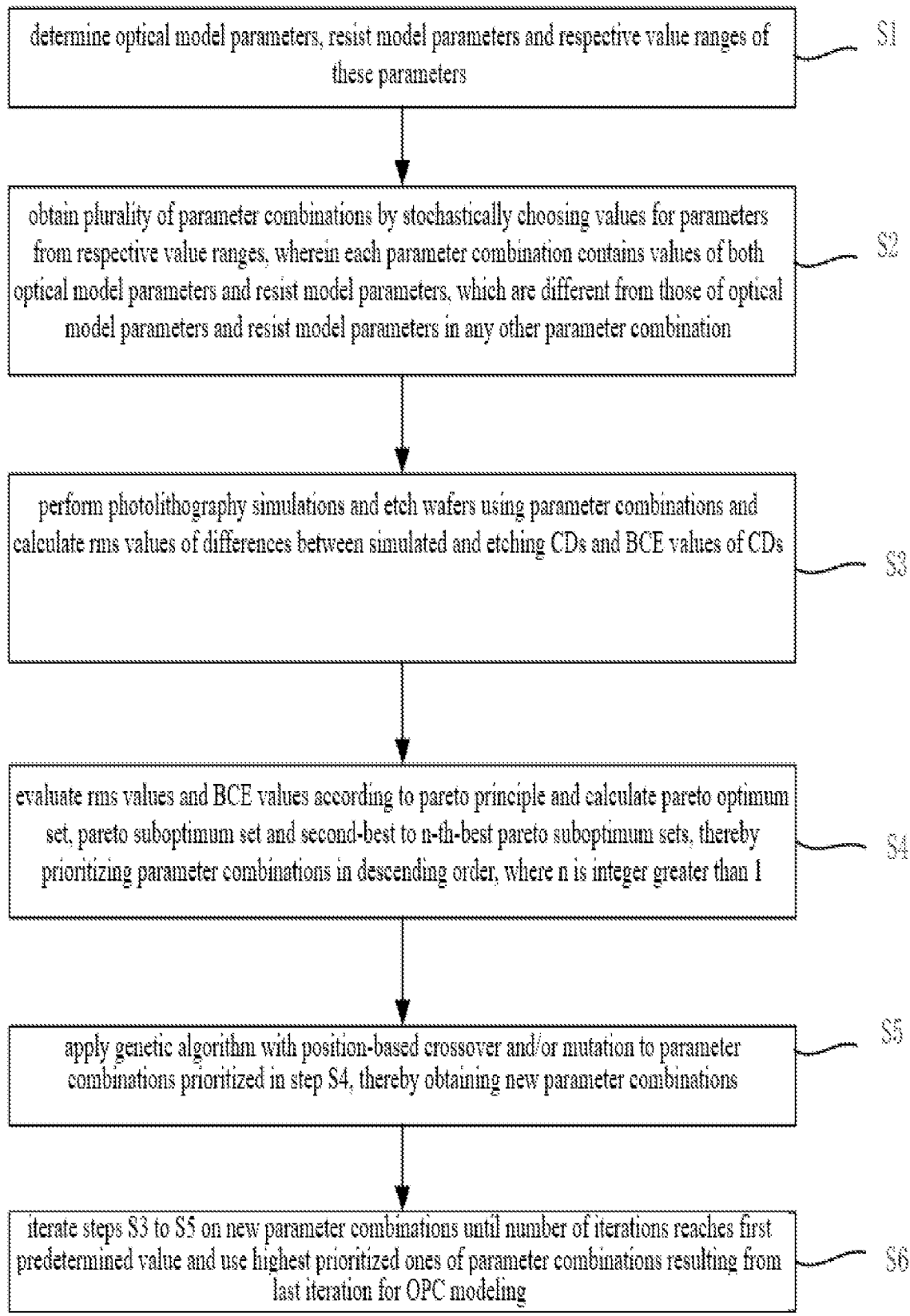

OPC MODELING METHOD

CROSS-REFERENCES TO RELATED APPLICATION

This application claims the priority of Chinese patent application number 202211111853.3, filed on Sep. 13, 2022, the entire contents of which are incorporated herein by reference.

TECHNICAL FIELD

The present invention relates to the field of semiconductor technology and, in particular, to an OPC modeling method.

BACKGROUND

Photolithography is a process for transferring a desired pattern from a reticle to a wafer. In order to increase conformity of the transferred patterns on the wafer to the ideal desired pattern, it is necessary to reduce the influence of an optical proximity effect on the transferred patterns during photolithography by performing optical proximity correction (OPC) on the reticle pattern from time to time.

The first step of OPC generally involves OPC modeling using parameters (also known as photolithography model parameters) typically determined by optical model parameters and resist model parameters. O when the optical model parameters and the resist model parameters are both optimized, can the photolithography model parameters be optimized.

Existing OPC modeling utilizes a step-wise model optimization strategy involving separate simulation of the optical model parameters and the resist model parameters: for example, first determining optimum values of the optical model parameters and then searching for optimum values of the resist model parameters based on the optimum values of the optical model parameters.

However, in the conventional step-wise optimization strategy for OPC modeling, the success of the second step depends on the optimum values determined in the first step. That is, in the second step of the step-wise optimization strategy, not all possibilities are checked. Consequently, there is a chance that although the parameters of one of the models have been optimized, the optimum values determined for the parameters of the other model are not true optimum values. In other words, the conventional step-wise optimization approach is less capable of determining optimum values for both the optical model parameters and the resist model parameters at the same time. It is very likely that, the best balance between the optical model parameters and the resist model parameters cannot be achieved, and the photolithography model parameters cannot be optimized.

SUMMARY OF THE INVENTION

It is an objective of the present invention to provide an OPC modeling method capable of simultaneously adjusting optical model parameters and resist model parameters and determining optimum values for the optical model parameters and the resist model parameters, which enables balance between the optical model parameters and the resist model parameters and optimization of the photolithography model parameters.

The above objective is attained by an OPC modeling method provided in the present invention, which includes:

step S1: determining optical model parameters, resist model parameters, as well as respective value ranges of the optical model parameters and the resist model parameters;

step S2: obtaining a plurality of parameter combinations by stochastically choosing values for the optical model parameters and the resist model parameters from the respective value ranges, wherein each parameter combination contains values of both the optical model parameters and the resist model parameters, and each parameter combination is different from any other parameter combination;

step S3: performing photolithography simulations and etching wafers using the plurality of parameter combinations, calculating root mean square (RMS) values of differences between simulated critical dimensions (CDs) and etching CDs, and calculating Bossung curve error (BCE) values of the CDs;

step S4: evaluating the RMS values and the BCE values according to Pareto principle and calculating a Pareto optimum set, a Pareto suboptimum set and second-best to N-th-best Pareto suboptimum sets, to prioritize the plurality of parameter combinations in a descending order, where N is an integer greater than 1;

step S5: applying a genetic algorithm with position-based crossover and/or mutation to the plurality of parameter combinations prioritized in step S4, to obtain a plurality of new parameter combinations; and step S6: iterating steps S3 to S5 on the plurality of new parameter combinations until a number of iterations reaches a first predetermined value, and using highest prioritized ones of parameter combinations resulting from a last iteration for OPC modeling.

Optionally, in the OPC modeling method, calculating the RMS values of the differences between the simulated and etching CDs may include:

measuring the etching CDs and the simulated CDs that are obtained using a photolithography model;

calculating the differences between the etching CDs and the simulated CDs; and calculating the RMS values.

Optionally, in the OPC modeling method, calculating the BCE values of the simulated CDs and the etching CDs may include:

plotting a first Bossung curve with the etching CDs;

plotting a second Bossung curve with the simulated CDs; and calculating deviation scores of the first and second Bossung curves as the BCE values.

Optionally, in the OPC modeling method, the BCE values may be evaluated using maximal information coefficients (MICs), each of which increases with a decrease of a respective one of the BCE values.

Optionally, in the OPC modeling method, each MIC may be calculated according to:

$$MIC(X, Y) = \max_{n_x \times n_y \leq B(n,\alpha)} \left\{ \frac{MAX_G(I_G(X, Y))}{\log_2 \min(n_x, n_y)} \right\},$$

where $n_x$ and $n_y$ are the number of buckets on x and y axes; G represents a number of $n_x \times n_y$ grid in (X, Y); $I_G$ (X, Y) represents mutual information under the grid G; B (n, α) is a function of a data size n expressed as n^α, where 0<α<1; and $\log_2 \min(n_x, n_y)$ is a normalization term which ensures that the MIC lies in a range of from 0 to 1.

Optionally, in the OPC modeling method, evaluating the RMS values and the BCE values according to Pareto principle may include:

combining the RMS values and the BCE values into a plurality of Y (RMS, BCE) combinations; and finding one or more of the plurality of Y (RMS, BCE) combinations that satisfy $(Y)=\{y''{\in}Y{:}\{y''{>}y', y''{\neq}y'\}=\emptyset\}$, wherein y" represents Pareto optimal solutions.

Optionally, in the OPC modeling method, in step S5, the genetic algorithm may be performed on the prioritized parameter combinations with weights assigned thereto, wherein the weights are determined by priority orders of the parameter combinations, wherein the prioritized parameter combinations have descending probabilities, in accordance with the priority orders, of being subjected to position-based crossover.

Optionally, in the OPC modeling method, each position-based crossover operation may include:

performing a crossover calculation on parameter values at a position in at least two parameter combinations to derive a parameter value at a same position in a parameter combination of interest.

Optionally, in the OPC modeling method, each mutation operation may include:

determining whether a number of iterations in which the Pareto optimum set is not updated exceeds a second predetermined value;

if no, performing regular mutation on the values of the optical model parameters and the resist model parameters under original conditions; and if yes, randomly selecting some of the values of the optical model parameters and the resist model parameters and performing intensified mutation on the selected values under the original conditions.

Optionally, in the OPC modeling method, the optical model parameters may include one or more of numerical aperture, resolution, aberration, polarization and optical constant of a projection objective, and the resist model parameters may include one or more of refractive index, layer thickness, light propagation and polarization metrics of photoresist.

Optionally, in the OPC modeling method, step S1 may further include determining accuracies of the parameters, wherein the highest prioritized parameter combinations obtained in step S6 include a highest prioritized parameter combination in each of sub-ranges obtained by dividing the value ranges according to the accuracies, wherein a set of the highest prioritized parameter combinations in each of sub-ranges form an optimum parameter combination set for OPC modeling.

In the OPC modeling method provided in the present invention, the optical model parameters and the resist model parameters are simultaneously adjusted, and optimum values for both the optical model parameters and the resist model parameters can be found to enable best balance between the optical model parameters and the resist model parameters. In this way, the photolithography model parameters can be optimized to enable the establishment of an optimal OPC model.

BRIEF DESCRIPTION OF THE DRAWINGS

The sole FIGURE is a flowchart of an OPC modeling method according to an embodiment of the present invention.

DETAILED DESCRIPTION

Particular embodiments of the present invention will be described in greater detail below with reference to the accompanying drawing. From the following description, advantages and features of the invention will become more apparent. Note that the FIGURE is provided in a very simplified form not necessarily drawn to exact scale and for the only purpose of facilitating easy and clear description of the embodiments.

As used hereinafter, the terms "first", "second" and the like may be used to distinguish between similar elements without necessarily implying any particular ordinal or chronological sequence. It is to be understood that the terms so used are interchangeable, whenever appropriate. Similarly, if a method is described herein as including a series of steps, the order of such steps as presented herein is not necessarily the only order in which such steps may be performed, and certain of the stated steps may possibly be omitted and/or certain other steps not described herein may possibly be added to the method.

Referring to the sole FIGURE, the present invention provides an OPC modeling method including:

S1) determining optical model parameters, resist model parameters and respective value ranges of these parameters;

S2) obtaining a plurality of parameter combinations by stochastically choosing values for the parameters from the respective value ranges, each parameter combination containing values of both the optical model parameters and the resist model parameters, which are different from those of the optical model parameters and the resist model parameters in any other parameter combination;

S3) performing photolithography simulations and etching wafers using the plurality of parameter combinations, and calculating root mean square (RMS) values of differences between simulated critical dimensions (CDs) and etching CDs and Bossung curve error (BCE) values of the CDs;

S4) evaluating the RMS values and the BCE values according to the Pareto principle and calculating a Pareto optimum set, a Pareto suboptimum set and second-best to N-th-best Pareto suboptimum sets, thereby prioritizing the plurality of parameter combinations in a descending order, where N is an integer greater than 1;

S5) applying a genetic algorithm with position-based crossover and/or mutation to the plurality of parameter combinations prioritized in step S4 to obtain a plurality of new parameter combinations; and S6) iterating steps S3 to S5 on the plurality of new parameter combinations until the number of iterations reaches a first predetermined value and using highest prioritized ones of parameter combinations resulting from the last iteration for OPC modeling.

In step S1, the optical model parameters may include optical properties of a projection objective in a photolithography tool, for example, one or more of numerical aperture (NA), resolution σ, aberration, polarization and optical constant. In embodiments of the present invention, NA, aberration, polarization and optical constant may be chosen as the optical model parameters. Next, the respective value ranges for NA, aberration, polarization and optical constant are determined, for example, as 0-1, 2-5, 6-10 and 6-10, respectively. These numbers are illustrative examples only and not intended to limit the value ranges for the parameters. In other embodiments of the present invention, other value ranges are possible. The resist model parameters may include properties of photoresist layers coated on the wafers, for example, one or more of refractive index, layer thickness and light propagation and polarization metrics. In embodiments of the present invention, refractive index, layer thickness and light propagation and polarization metrics may be chosen as the resist model parameters. Next, the respective value ranges for photoresist refractive index, layer thickness and light propagation and polarization metrics are determined, for example, as 16-20, 21-25, 26-30 and 31-35, respectively. These numbers are illustrative examples only and not intended to limit the value ranges for the parameters. In other embodiments of the present invention, other value ranges are possible. Preferably, data for all the parameters are collected for use in the subsequent steps. Step S1 may further include determining accuracies of the parameters. In this case, the highest prioritized parameter combinations in step S6 include highest prioritized parameter combinations in each of sub-ranges obtained by dividing the value ranges according to the accuracies. These highest prioritized parameter combinations in the respective sub-ranges form an optimum parameter combination set for OPC modeling.

In step S2, the parameter combinations are obtained by stochastically choosing values. For example, three parameter combinations may be obtained. The first combination may consist of 0.5, 3, 7, 12, 19, 22, 27 and 34, in which 0.5, 3, 7, 12 and 19 are values of the respective optical model parameters, NA, aberration, polarization and optical constant, and 19, 22, 27 and 34 are values of the respective resist model parameters, photoresist refractive index, layer thickness, light propagation and polarization metrics. The second combination may consist of 0.7, 2.5, 8, 14, 18, 23, 28 and 33, in which 0.7, 2.5, 8 and 14 are values of the respective optical model parameters, NA, aberration, polarization and optical constant, and 18, 23, 28 and 33 are values of the respective resist model parameters, photoresist refractive index, layer thickness, light propagation and polarization metrics. The third combination may consist of 0.1, 4, 9, 13, 17, 24, 29 and 32, in which 0.1, 4, 9 and 13 are values of the respective optical model parameters, NA, aberration, polarization and optical constant, and 17, 24, 29 and 32 are values of the respective resist model parameters, photoresist refractive index, layer thickness, light propagation and polarization metrics.

In step S3, the RMS values of the differences between the simulated and etching CDs can be calculated using a method including: measuring etching CDs and photolithography model-simulated CDs; calculating differences between the etching CDs and the photolithography model-simulated CDs; and calculating RMS values of the differences. The BCE values of the simulated and etching CDs can be calculated using a method including: plotting first Bossung curves with the etching CDs; plotting second Bossung curves with the simulated CDs; and calculating deviation scores of the first and second Bossung curves as the BCE values. Continuing the above example, for the first parameter combination, a photolithography simulation is performed and a wafer is etching with the parameters in the first parameter combination, and simulated CDs and etching CDs are thereby obtained at a plurality of points. An RMS value of differences between the simulated and etching CDs at the points is then calculated. Since simulated CDs will be obtained at a plurality of points in each simulation and etching CDs will be obtained at the plurality of points from the etching of a respective wafer, a first Bossung curve and a second Bossung curve will be obtained for each parameter combination, followed by calculating a deviation score of the first and second Bossung curves. In the above example with three parameter combinations, three RMS values of differences and three BCE values will be obtained.

Maximal information coefficients (MICs) may be used to evaluate the BCE values. This is, the MICs are used to evaluate strength of linear or non-linear association between the first and second Bossung curves. Higher strength of association corresponds to a greater MIC and a smaller BCE value. That is, the BCE values will be minimized when the corresponding MICs are maximized. Each MIC can be calculated according to:

$$MIC(X, Y) = \max_{n_x \times n_y \leq B(n,\alpha)} \left\{ \frac{MAX_G(I_G(X, Y))}{\log_2 \min(n_x, n_y)} \right\};$$

where $n_x$ and $n_y$ are the number of buckets on x and y axes; G represents the number of $n_x \times n_y$ grid in (X, Y); $I_G$ (X, Y) represents mutual information under the grid G; B (n, $\alpha$) is a function of a data size n expressed as $n^\alpha$ ($0<\alpha<1$), which limits the maximum possible number of buckets; and $\log_2 \min(n_x, n_y)$ is a normalization term which ensures that the MIC lies in the range of from 0 to 1. The MIC increases with strength of association between x and y. The closer the MIC to 1, the stronger the association; and vice versa (i.e., the closer the MIC to 0, the weaker the association)

Next, in step S4, based on the RMS and BCE values, the Pareto optimum set, the Pareto suboptimum set and the second-best to N-th-best Pareto suboptimum sets are calculated. The combinations are then sorted in the order of the Pareto optimum set, the Pareto suboptimum set and the second-best to N-th-best Pareto suboptimum sets. A Pareto front is calculated using a method including: combining the RMS (root mean square) values and BCE (Bossung curve error) into a plurality of Y (RMS, BCE) combinations; and finding those of the Y (RMS, BCE) combinations that satisfy (Y)={y"∈ Y:{y">y, y"≠y'}=∅}, where y" represents Pareto optimal solutions, and y' represents other solutions within the same interval. Specifically, in all the Y combinations, y" strictly dominates y' (i.e., general dominance because of BCE and RMS values that are both smaller), i.e., y">y'. Therefore, the Pareto front, i.e., the Pareto optimum set, in which the RMS and BCE values are both minimized, is obtained as (Y)={y"∈ Y:{y">y', y"≠y'}=∅}.

In step S5, the genetic algorithm is performed on the prioritized parameter combinations with weights assigned thereto, which are determined by their priorities. The probabilities of the prioritized parameter combinations being subjected to position-based crossover are in descending order just as their priorities are. That is, the probability of a parameter combination with a higher priority being subjected to position-based crossover is higher. Continuing the above example, if the parameter combinations are prioritized in the order of the first parameter combination, the second parameter combination, the third parameter combination and a fourth parameter combination, then it is most likely that the first and second parameter combinations are subjected to position-based crossover, it is less likely that the first and third parameter combinations are subjected to position-based crossover, and it is least likely that the first and fourth parameter combinations are subjected to position-based crossover. For example, as a result of a position-based crossover operation on the first and second parameter combinations, whose NAs are 0.5 and 0.7, respectively, an offspring NA of 0.6 may be obtained. This crossover approach is merely an illustrative example, and in other embodiments of the present invention, alternative crossover approaches may be employed. The position-based crossover operation on the first and second parameter combinations, whose aberrations are 3 and 2.5, respectively, may also result in an offspring aberration of 2.75. The 0.6 and 2.75 are the results of some parameters in the combinations, and the results for other parameters may be determined in a similar way and, therefore, need not be described in further detail herein.

In step S5, the parameter combinations from crossover may be mutated using a method including: determining the number of iterations in which the Pareto optimum set is not updated exceeds a second predetermined value that is 10, for example. In alternative embodiments of the present invention, other numbers, for example, selected from the range of 10 to 20, are also possible. If no, the values of the optical model parameters and the resist model parameters are subjected to regular mutation under the original conditions. As the number of iterations increases, the probability of mutation decreases. If yes, in addition to the regular mutation under the original conditions, some of the values of the optical model parameters and the resist model parameters are stochastically selected and subjected to intensified mutation also under the original conditions. The intensified mutation is carried out at a random probability chosen from a range defined between preset upper and lower limits.

In step S6, the first predetermined value may be 100. However, in other embodiments of the present invention, other numbers are also possible, such as 200, or another number selected from the range of 100 to 200. After each iteration, a prioritized sequence of parameter combinations in descending order is obtained, and some highest prioritized ones of them are recorded. When it is detected that the number of iterations reaches the first predetermined value, a few highest prioritized parameter combinations are output, each of which contains a sub-combination of the optical model parameters and a sub-combination of the resist model parameters and can be used as a photolithography model for establishment of an OPC model.

In summary, in the OPC modeling method provided in embodiments of the present invention, the optical model parameters and the resist model parameters are simultaneously adjusted, and optimum values for the optical model parameters and the resist model parameters can be found to enable best balance between the optical model parameters and the resist model parameters. In this way, the photolithography model parameters can be optimized to enable the establishment of an optimal OPC model.

Presented above are merely a few preferred embodiments of the present invention, which do not limit the invention in any way. Changes in any forms made to the principles and teachings disclosed herein, including equivalents and modifications, by any person of ordinary skill in the art without departing from the scope of the invention are intended to fall within the scope of the invention.

What is claimed is:

1. An optical proximity correction (OPC) modeling method, comprising:
   step S1: determining optical model parameters, resist model parameters, as well as respective value ranges of the optical model parameters and the resist model parameters;
   step S2: obtaining a plurality of parameter combinations by stochastically choosing values for the optical model parameters and the resist model parameters from the respective value ranges, wherein each parameter combination contains values of both the optical model parameters and the resist model parameters, and each parameter combination is different from any other parameter combination;
   step S3: performing photolithography simulations and etching wafers using the plurality of parameter combinations, calculating root mean square (RMS) values of differences between simulated critical dimensions (CDs) and etching CDs, and calculating Bossung curve error (BCE) values of the CDs;
   step S4: evaluating the RMS values and the BCE values according to Pareto principle and calculating a Pareto optimum set, a Pareto suboptimum set and second-best to N-th-best Pareto suboptimum sets, to prioritize the plurality of parameter combinations in a descending order, where N is an integer greater than 1;
   step S5: applying a genetic algorithm with position-based crossover and/or mutation to the plurality of parameter combinations prioritized in step S4, to obtain a plurality of new parameter combinations; and
   step S6: iterating steps S3 to S5 on the plurality of new parameter combinations until a number of iterations reaches a first predetermined value, and using highest prioritized ones of parameter combinations resulting from a last iteration for OPC modeling.

2. The OPC modeling method of claim 1, wherein calculating the RMS values of the differences between the simulated and etching CDs comprises:
   measuring the etching CDs and the simulated CDs that are obtained using a photolithography model;
   calculating the differences between the etching CDs and the simulated CDs; and
   calculating the RMS values.

3. The OPC modeling method of claim 1, wherein calculating the BCE values of the simulated CDs and the etching CDs comprises:
   plotting a first Bossung curve with the etching CDs;
   plotting a second Bossung curve with the simulated CDs; and
   calculating deviation scores of the first and second Bossung curves as the BCE values.

4. The OPC modeling method of claim 3, wherein the BCE values are evaluated using maximal information coefficients (MICs), wherein each MIC increases with a decrease of a respective one of the BCE values.

5. The OPC modeling method of claim 4, wherein each MIC is calculated according to:

$$MIC(X, Y) = \max_{n_x \times n_y \leq B(n, \alpha)} \left\{ \frac{\text{MAX}_G(I_G(X, Y))}{\log_2 \min(n_x, n_y)} \right\},$$

where $n_x$ and $n_y$ are the number of buckets on x and y axes; G represents a number of $n_x \times n_y$ grid in (X, Y); $I_G$ (X, Y) represents mutual information under the grid G; B (n, α) is a function of a data size n expressed as n^α, where 0<α<1; and $\log_2 \min(n_x, n_y)$ is a normalization term which ensures that the MIC lies in a range of from 0 to 1.

6. The OPC modeling method of claim 1, wherein evaluating the RMS values and the BCE values according to Pareto principle comprises:
   combining the RMS values and the BCE values into a plurality of Y (RMS, BCE) combinations; and
   finding one or more of the plurality of Y (RMS, BCE) combinations that satisfy (Y)={y"∈Y:{y">y', y"≠y'}= ∅}, wherein y" represents Pareto optimal solutions.

7. The OPC modeling method of claim 1, wherein in step S5, the genetic algorithm is performed on the prioritized parameter combinations with weights assigned thereto, wherein the weights are determined by priority orders of the parameter combinations, wherein the prioritized parameter combinations have descending probabilities, in accordance with the priority orders, of being subjected to position-based crossover.

8. The OPC modeling method of claim 7, wherein each position-based crossover operation comprises:
performing a crossover calculation on parameter values at a position in at least two parameter combinations to derive a parameter value at a same position in a parameter combination of interest.

9. The OPC modeling method of claim 7, wherein each mutation operation comprises:
determining whether a number of iterations in which the Pareto optimum set is not updated exceeds a second predetermined value;
if not, performing regular mutation on the values of the optical model parameters and the resist model parameters under original conditions; and
if yes, randomly selecting some of the values of the optical model parameters and the resist model parameters and performing intensified mutation on the selected values under the original conditions.

10. The OPC modeling method of claim 1, wherein the optical model parameters include one or more of numerical aperture, resolution, aberration, polarization and optical constant of a projection objective, and the resist model parameters include one or more of refractive index, layer thickness, light propagation and polarization metrics of photoresist.

11. The OPC modeling method of claim 1, wherein step S1 further comprises determining accuracies of the optical model parameters and the resist model parameters, and wherein the highest prioritized parameter combinations obtained in step S6 include a highest prioritized parameter combination in each of sub-ranges obtained by dividing the value ranges according to the accuracies, wherein a set of the highest prioritized parameter combinations in each of sub-ranges form an optimum parameter combination set for OPC modeling.

* * * * *